UNITED STATES PATENT OFFICE.

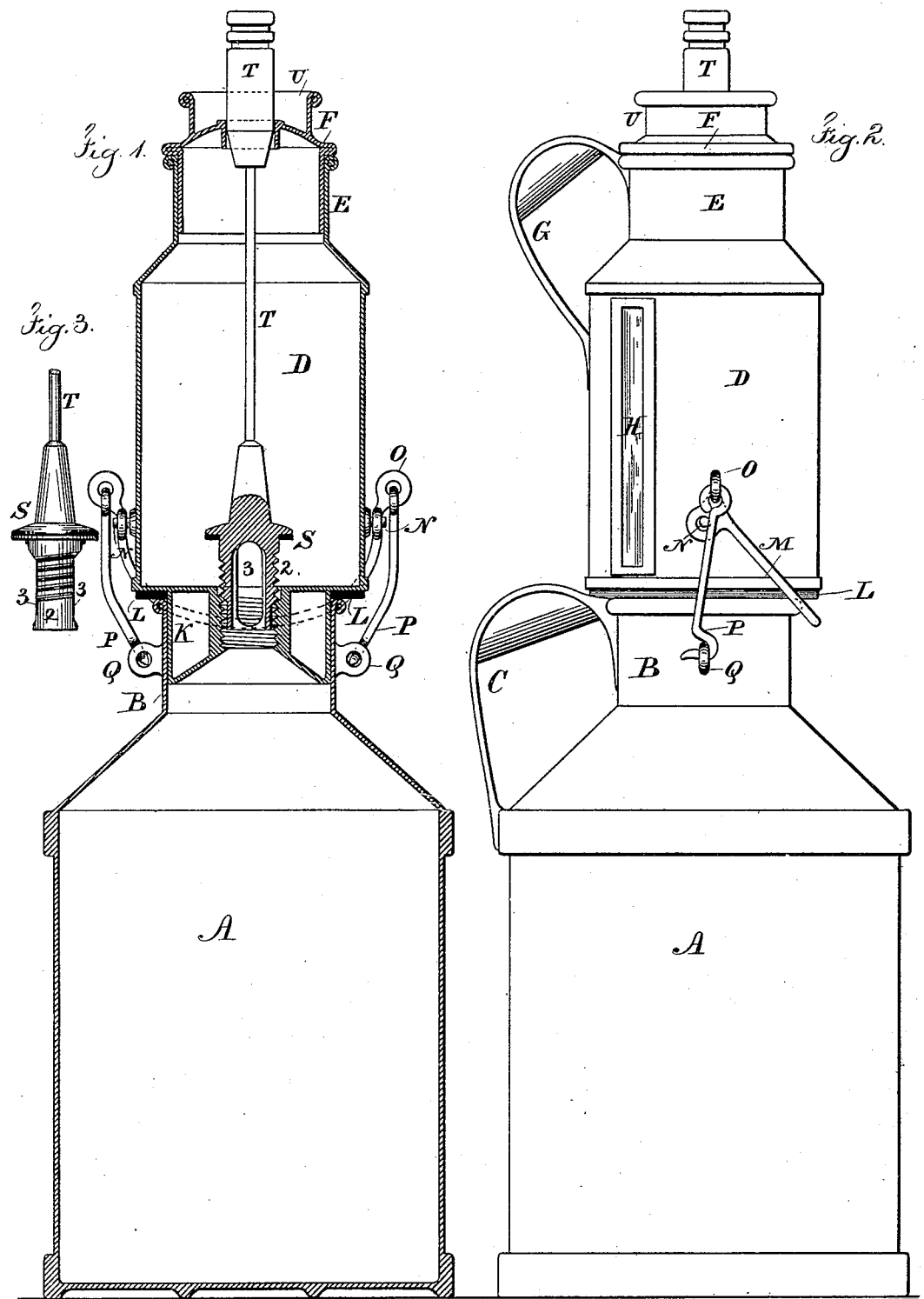

WILLIAM H. JOHNSON, OF WESTBOROUGH, MASSACHUSETTS.

CREAM-SEPARATOR.

SPECIFICATION forming part of Letters Patent No. 337,266, dated March 2, 1886.

Application filed November 21, 1885. Serial No. 183,498. (No model.)

*To all whom it may concern:*

Be it known that I, WILLIAM H. JOHNSON, of Westborough, in the county of Worcester and State of Massachusetts, have invented an Improvement in Cream-Separators, of which the following is a specification.

Before my invention a can had been made for containing milk, and a vessel above the same connected to the can by a plug and cock, the object being to allow the cream to rise into the upper vessel, and the skimmed milk to subside into the lower vessel. This, however, is difficult and costly to construct, is not easily kept clean, and the parts are liable to be separated in transportation.

My invention is made with reference to providing a movable cream-holder adapted to the mouth of a milk-can, with means for insuring a water-tight joint, and a stop-valve in the bottom of the cream-holder, so that the cream-holders may be removed when filled with cream and cans be interchangeable, and when connected together form a receptacle for the milk, with facility afforded for the cream to rise and the skimmed milk to subside, and the valve in the bottom of the cream-holder can be tightly closed before removing the cream-holder from the can. By this construction the milk-dealer may supply the dairy-men milk-cans and cream-holders, which the dairy-men may connect together, fill with milk, and plunge into cold water for the cream to rise. Then the cream-holders may be separated from the cans and used to transport the cream to market, leaving the skimmed milk on the farm, where it may be advantageously used in rearing calves and feeding swine, and thereby lessening the cost of transporting the valuable portion of the milk to market, and leaving the skimmed milk behind, where it is of more value than it would be if sold, or the two may be transported to market together and sold separately. By my improved construction, in which the cream-holders are interchangeable, double or treble the number of cream-holders to cans will be provided, so as to exchange empty for filled cream-holders, thus saving the expense of transporting the milk-cans and the wear and tear on the same.

In the drawings, Figure 1 is a vertical section of the can complete. Fig. 2 is an elevation at right angles to Fig. 1; and Fig. 3 is a detached view of the valve in the bottom of the cream-holder.

The lower or main can is made of any suitable size, shape, or material, preferably of sheet-tin, and cylindrical, and the body A is contracted at the upper end to the cylindrical neck B, and usually a handle, C, is provided at one side. The top edge of this neck B must be true, and of uniform or nearly uniform size. This neck should be sufficiently large to allow of the introduction of a person's hand and arm to facilitate cleaning.

The cream-holding vessel D is preferably cylindrical and of a size proportioned to the size of the milk-can, so as to receive when filled all the cream that may separate from the milk. At the top of this cream-holder is a contracted neck, E, that receives a cover, F, and there is by preference a handle, G, at one side, and there may be a vertical opening in the cylindrical portion of the cream-holder, with wings or flanges for receiving a glass, H, by which the cream can be inspected, so as to ascertain whether there is milk in the lower part of the cream-holder or not.

There is upon the bottom of the cream-holder a cylindrical base, K, that passes freely into the neck B of the can A, and around this base K are one or more rubber or other elastic washers, L, setting against the flat bottom of the cream-holder, so that when the cream-holder is applied to the milk-can the elastic washers rest upon the top of the neck B, and the cream-holder is made tight with the can at this point by pressure. I prefer and use the toggle-lever M, passing half-way around the cream-holder and having eyes near its ends for the pivot-pins N upon the cream-holder, and eyes O for the hanging hooks P, and there are eyes Q upon the sides of the neck B, into which the hooks P are passed at the time the lever M is swung upwardly, and by swinging this lever M downwardly the eyes O are caused to pass above and beyond the pivots N and thereby apply a powerful tension to the hooks P to compress the rubber rings or elastic washers L and render the joint tight. The eyes O being carried over and beyond the pivot-pins N, the line of tension is carried to the opposite side of the pins to that at which it was first applied and forms a lock which securely holds the lever down to its lowest point and fastens the cream-holder to the can. The cream-holder is loosened by lifting the lever and throwing the line of tension back again to the side at which it was when first applied. These parts may be inverted by pivoting the lever M upon the neck B of the can and placing the eyes Q upon the cream-holder; or any other suitable connecting device may be employed.

In the center of the base K is an opening through which the cream may rise into the cream-holder and the skimmed milk subside into the can, and to this opening a movable valve, S, is applied, the stem T of the valve passing up through an opening in the cover F of the cream-holder, so as to be operated without removing the cover.

I prefer to make the upper part of the stem T as a cylindrical head passing through an opening in the cover F of corresponding size, so that this stem will remain nearly tight at the cover, whether the valve S is raised or depressed, and there is a cup, U, upon the cover F, around the stem T, to catch any leakage that there may be around such stem, and to serve as a handle for removing the cover, and the cover F is made with a flange passing inside the neck E, as usual with milk-cans.

The valve S may be of any suitable character—such, for instance, as a tapering plug at the end of the stem T, to pass into the opening in the base K; but I prefer to make use of a screw-plug or valve, such as that shown, in which the cylindrical portion 2 of the valve passes into the hole in the base K, and is provided with a screw-thread upon the outside fitting a corresponding screw-thread within the opening in the base K, and this cylinder 2 is slotted vertically, as at 3, so that when the plug is elevated by unscrewing the same, as seen in Fig. 1, the slots 3 form free passage-ways for the cream to pass upwardly, and the skimmed milk to pass downwardly, and the valve S, at the upper end of this cylinder 2, has an under face of rubber, or other elastic material, so that when screwed down to place the valve will be tightly closed.

I claim as my invention—

1. The can A, having a neck, B, in combination with the cream-holder D, having a base, K, that passes into the neck B, with an opening through the base, an elastic washer, L, around the base K, to rest upon the top of the neck B, means, substantially as specified, for connecting the can A and cream-holder D, and a valve applied at the opening in the base K, substantially as specified.

2. The combination, with the can A and its neck B, of the cream-holder D and its base K, the elastic washer L, lever M, pivots N, hooks P, and eyes Q, for removably connecting and securing the cream-holder to the can, and a removable plug or valve applied at the opening in the base of the cream-holder, substantially as specified.

3. The combination, with the cream-holder D, having a base with an opening in it, of the valve S, with a slotted screw-cylinder passing into the screw-threaded opening in the base K, a cover to the cream-holder, and a stem to the valve passing up into the cover, substantially as set forth.

4. The cream-holder D and the removable cover F to the same, with a central opening, and the cup U around the same, in combination with the valve or plug fitting an opening in the bottom of the cream-holder, and a stem to the same passing through an opening in the cover, substantially as set forth.

Signed by me this 11th day of November, A. D. 1885.

WILLIAM H. JOHNSON.

Witnesses:
  CHAS. B. FROST,
  LOUIS E. DENFELD.